United States Patent [19]
Martyn

[11] 3,862,507
[45] Jan. 28, 1975

[54] FISH BAIT HOLDER

[76] Inventor: Emerson F. Martyn, 1807 Prospect St., La Salle, Ill. 61301

[22] Filed: Dec. 10, 1973

[21] Appl. No.: 423,478

[52] U.S. Cl. ............................. 43/4, 81/43, 294/25
[51] Int. Cl. ........................................... A01k 97/00
[58] Field of Search .................. 43/1, 4, 55; 81/43; 128/354, 304; 294/25; 30/298

[56] References Cited
UNITED STATES PATENTS

| | | | |
|---|---|---|---|
| 993,720 | 5/1911 | Schneider | 294/25 |
| 2,929,166 | 3/1960 | Sneide | 43/4 |
| 3,181,198 | 5/1965 | Stelzen | 294/25 |
| 3,293,958 | 12/1966 | Smith | 81/43 |

*Primary Examiner*—Warner H. Camp
*Attorney, Agent, or Firm*—Marden S. Gordon

[57] ABSTRACT

A fish bait holder has a pair of substantially identical ring like devices adapted to be worn on the thumb and index finger of an individual's hand with each ring supporting a rectangular platform extending outwardly from the ring normal to the plane of the ring in a manner to rest on the surface of the fingertip having the ring thereon such that a worm or the like may be gripped between the platforms to hold the same. Further, each of the rings is adjustable as to the size of the ring opening to permit proper fitting on fingers having different diameters.

4 Claims, 6 Drawing Figures

PATENTED JAN 28 1975

3,862,507

3,862,507

FISH BAIT HOLDER

BACKGROUND OF THE INVENTION

1. Field of the Invention

This invention relates generally to holding devices and more particularly to a novel fish bait holder adapted to be used by fishermen and the like to enable them to quickly bait a fishing hook in a manner firmly gripping the bait during the baiting procedure and without the necessity of the fisherman's hand touching the bait. 2. Description of the Prior Art The sport of fishing is among one of the most popular sports in that persons of all ages may participate therein regardless of physical handicaps or lack of athletic prowess. However, in the recreational activity of fishing, it is required that the fishing hook constantly be baited with fresh bait, such as worms, and it is well known that in the process of baiting a hook that frequently the barbs of the hook are accidentally jabbed into the fingers of the fisherman. Further, it is normally required that gloves be worn as the fisherman does not particularly care for the feel of the bait, and in addition, it is desirable to avoid touching the bait such that there is no chance of a human scent being placed on the bait which would chase the fish away from the same.

While attempts have been made in the past to develop holders for fish bait for use when baiting a fishing hook, such suffer from one or more disadvantages as to being overly complex and difficult in use, not being easily and readily stored in a manner readily available for use, being overly expensive to purchase and yet easily lost when in the field or stream, and the like.

SUMMARY OF THE INVENTION

The present invention recognizes the need for a fish bait holder for use in holding bait during the baiting process of a hook without the bait having to touch the fisherman's hand, and provides a novel solution thereto which overcomes all of the deficiencies and disadvantages of presently available bait holders. The present invention provides a novel bait holder providing a protective covering for the fingers adjacent the bait to protect the same against inadvertent jabbing with the fishing hook, is adjustable to vary the size thereof so as to be worn by individuals having different finger sizes, and provides novel platforms intended to be used in conjunction with each other in a manner to grip the bait therebetween in a firm manner while placing the bait on the hook.

It is a feature of the present invention to provide a fish holding device for holding bait during the baiting of a fishing hook without requiring that the fisherman's hand touch the bait thus eliminating any chance of human scent on the bait.

A further feature of the present invention provides a fish bait holder for use in holding bait during the baiting of a fishing hook in a manner protecting the fisherman's fingers from the barbs of the hook.

Still a further feature of the present invention provides a fish bait holder for holding bait during the baiting of a hook and which is easy to slip on and off of a fisherman's hands, is used in the same manner as if the fingers were bare without the device such that there is no mashed or squashed bait, which may be easily carried in a pocket or tackle box handy for ready use, which is adjustable to fit over gloves which may be worn by the fisherman such that there is no need to remove the glove to bait the hook, and which provides a firm griping action on the bait to prevent loss of the same while baiting the hook.

The provision of a fish bait holder adapted for use by fisherman in the holding of bait during the baiting of a fishing hook, such a briefly outlined above, and possessing the stated features and advantages, constitutes the principal features and advantages of the present invention. The provision of a fish bait holding device which is relatively simple in its construction and which therefore may be readily manufactured at a relatively low cost and by simple manufacturing methods; one which is possessed of few parts and which therefore is unlikely to get out of order; one which is rugged and durable and which therefore may be guaranteed by the manufacturer to withstand many years of intended usage; one which is of an aesthetically pleasing and refined appearance; one which is easy to use and reliable and efficient in operation; and one which is otherwise well adapted to perform the services required of it, are among the desirable features and advantages which have been borne in mind in the production and development of the present invention.

Other features and advantages of this invention will be apparent during the course of the following description.

Brief Description of the Drawings

In the accompanying drawings forming a part of this specification, and in which like reference characters are employed to designate like parts throughout the same.

DESCRIPTION OF THE PREFERRED EMBODIMENT

Figure 1:
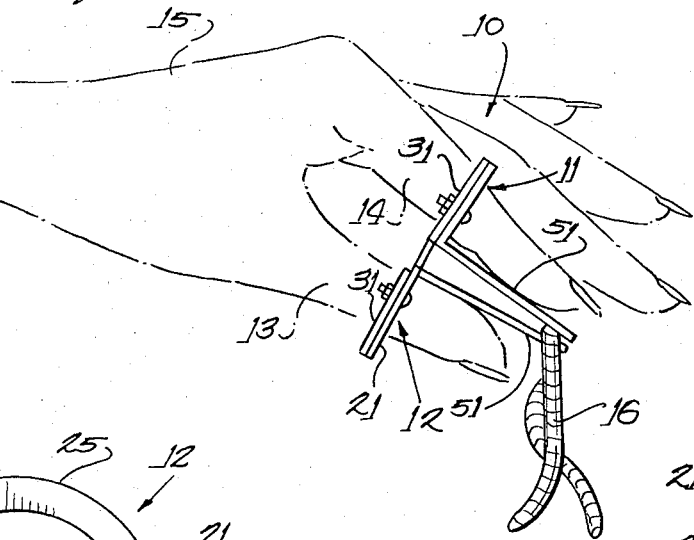
FIG. 1 is a side elevational view of the fish bait holder device of the present invention as being worn on an individual's finger in the intended manner and illustrated holding a worm between the jaws thereof.

Referring now to the drawings in detail there is illustrated a preferred form of a fish bait holding device constructed in accordance with the principles of the present invention and designated generally in its entirety by the reference numeral 10 and which is comprised of two substantially identical sections 11 and 12 which are intended to be worn on an individual's thumb 13 and index finger 14 of an individual's hand 15 in the gripping of a worm 16 to hold the worm while baiting a fishing hook. As sections 11 and 12 are substantially identical to each other, the description will direct itself to section 12 with it being understood that the same description would apply to the section 11. The bait holding device 10 may be manufactured out of metal, hard rubber, plastic, or any other suitable satisfactory material.

Figure 2:
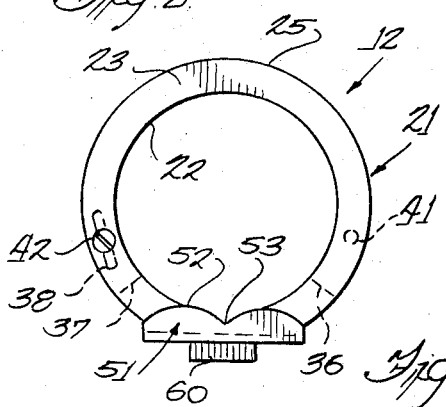
FIG. 2 is a front elevational view of one member forming the fish bait holder device.
Figure 3:
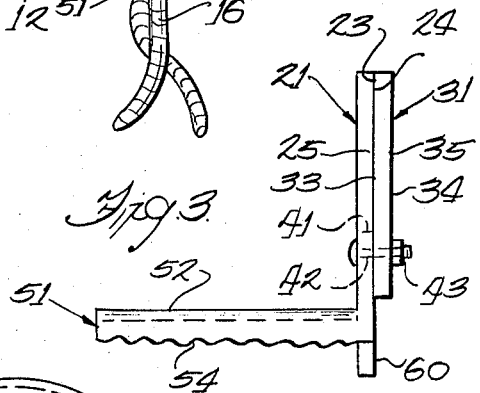
FIG. 3 is a side elevational view of the member of FIG. 2.
Figure 4:
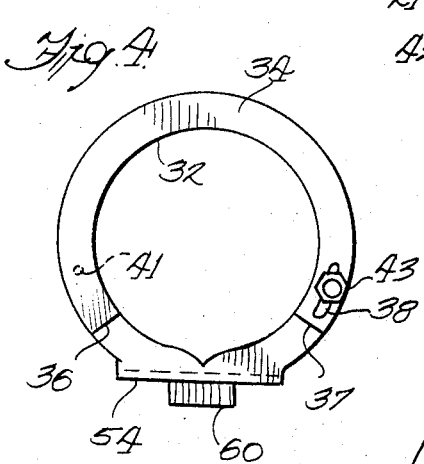
FIG. 4 is a rear elevational view of the member of FIG. 2.
Figure 5:
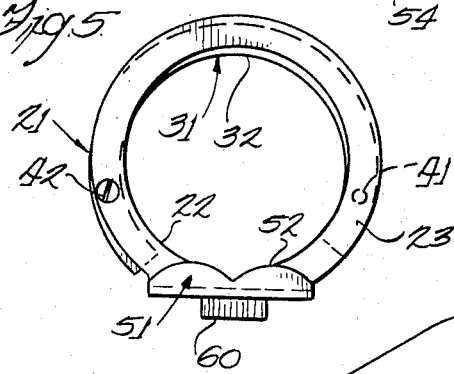
FIG. 5 is a front elevational view of the member of FIG. 2 with the sides of the ring opening shown in an adjusted position.
Figure 6:
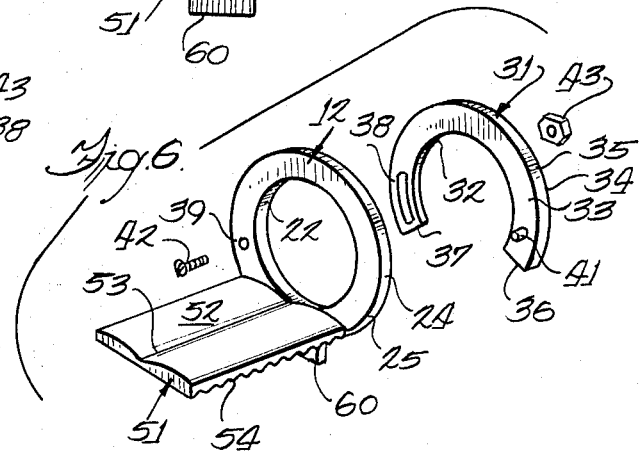
FIG. 6 is an exploded perspective view of the member of FIG. 2.

Referring to section 12 as illustrated in detail in FIG. 2 and 6 inclusive, it is seen that the section is comprised of a substantially flat circular ring member 21 having a finger opening 22 disposed centrally thereof and having a face surface 23, a back surface 24 and a circumferential edge surface 25. A C-shaped substantially flat ring like member 31 is provided having a finger opening 32, a face surface 33, a back surface 34, and a circumferential edge surface 35. The C-shaped member 31 is pivotally mounted to ring member 21 by a pivot pin 41 which projects outwardly of face surface 33 and is engaged in an opening in back surface 24 such that member 31 is pivotable relative to member 21 with face surface 33 in juxtaposition with back surface 24. In this regard it is to be noted that the diameter of openings 22 and 32 are substantially identical with the diameters of members 21 and 31 also being substantially identical. The pivot pin 41 is disposed adjacent one end 36 of member 31, with the opposite end 37 of member 31 having disposed therein an arcuate slot 38 extending away from the end 37, the slot being aligned with an aperture 39 in ring member 21 with the aligned aperture and slot receiving therethrough a threaded bolt 42 which is secured in position by a nut 43 threaded onto the shank thereof. It is thus seen that by pivoting member 31 relative to member 21 that the diameter of finger opening 22 is varied as the finger opening 32 projects into finger opening 22 in a manner to reduce the overall effective size thereof, this being as illustrated generally in FIG. 5 where member 31 has been pivoted counter-clockwise in a manner to project into the area of finger opening 22. In this manner finger opening 22 is readily adjustable for various sizes of individuals' fingers.

Formed integrally with the face surface 23 of member 21 along the bottom portion thereof and projecting outwardly therefrom substantially normal to the plane of the ring member is a substantially flat rectangularly shaped jaw member 51 having a top surface 52 in the form of side-by-side curved portions defining a groove 53 centrally of the jaw member and running longitudinally therealong and adapted for an individual's finger to be rested on the curved surface and centered over the groove. The jaw member 51 is provided with a bottom surface 54 having serrations extending therealong to provide a better gripping action on the worm 16.

Formed integrally with ring member 21 and projecting radially outwardly therefrom in a position located preferably beneath jaw member 51 and in the plane of the ring member is a stop member 60 which is adapted to be used in conjunction with the other device section 11 to line up the respective sections 11 and 12 such as shown in FIG. 1 for use in the gripping of the worm 16 between the jaw members 51.

In the operation of the device 10 of the present invention, section 11 has the finger opening 22 thereof adjusted so as to fit on the index finger 14 in a manner not sliding over the knuckle of the finger, with section 12 having the finger opening 22 thereof adjusted to fit on thumb 13 without projecting over the knuckle thereof, after which the jaw members 51 of each section are generally aligned and then operated together by a pinching movement of the index and thumb so as to grip a worm 16 or the like between the serrated bottom surfaces 54 of the jaw members to hold the same securely in position while baiting the hook with the same. It is seen that the jaw members serve to protect the fingers from any inadvertent jabbing of the fingers by a barb of a fishing hook.

The device 10 is readily carried in an individual's pocket or tackle box and is ready for prompt usage in a rapid and convenient manner to assist the fisherman in the baiting of the fishing hook without the fisherman having to touch the bait so that no human scent is placed on the bait, and after the hook is baited the device 10 is rapidly slipped off the fisherman's fingers in mere seconds and returned to the pocket or tackle box for later usage.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, What is claimed is:

1. A fish bait holding device intended for use in the holding of bait, such as worms, in a manner protecting an individual's fingers from a fishing hook during the baiting of the bait on the fishing hook, the device comprising a pair of substantially identical sections adapted to be worn by an individual on their index finger and thumb respectively, each section comprising a substantially flat circular first ring member having a finger opening disposed concentrically thereof and extending therethrough, a face surface, a back surface, and a circumferential edge surface; a C-shaped second ring member of a diameter substantially equal to said first ring member and having a finger opening disposed centrally thereof and extending therethrough of a diameter substantially equal to said first ring member finger opening, said second ring member including a face surface, a back surface, a circumferential edge surface, and a first and second terminal edge, said second ring member disposed adjacent a top portion of said first ring member with said second ring face surface in juxtaposition with said first ring back surface and with said first and second finger openings in axial alignment, pivot means disposed adjacent a first of said terminal edges and pivotally connecting said second ring to said first ring for pivotal movement relative thereto wherby said second ring finger opening is movable into and out of the area of said first ring opening in a manner to adjustably restrict the area of said first ring opening, means securing said second ring to said first ring in said adjusted position, a substantially flat rectangularly shaped platform like member having one end connected to the bottom portion of said first ring face surface with said platform projecting outwardly therefrom in a direction substantially normal to the plane of said first ring, said platform having a top surface defining a finger rest portion, and a bottom surface defining a jaw member adapted to cooperate in the gripping of the bait whereby said sections may be used in conjunction with each other so as to grip bait between jaw members disposed in confronting relationship with each other under control of an individual's index and thumb for movement in directions toward and away from each other.

2. The fish bait holding device as set forth in claim 1 further comprising a stop member formed integrally with said first ring member and projecting radially outwardly from the circumferential edge thereof in a direction substantially normal to the plane of the jaw member and adapted for use in aligning said sections relative to each other when in use.

3. The fish holding device as set forth in claim 2 wherein said means for holding said second ring member to said first ring member in said adjusted position comprises an arcuate slot disposed in said second ring member adjacent said second terminal edge thereof, an aperture disposed in said first ring member in alignment with said slot, and a nut adapted to be threaded onto said bolt to retain said second ring member in its adjusted position relative to said first ring member.

4. The fish holding device as set forth in claim 3 wherein said platform is provided on the top surface with a curved finger rest portion defining a longitudinally extending groove adapted to centrally position an individual's finger on said finger rest portion, and said jaw member is provided with a plurality of serrations extending thereacross adapted to assist in the gripping of bait.

* * * * *